United States Patent
Pierrot, III et al.

[11] 3,731,719
[45] May 8, 1973

[54] DELIMBING MACHINE CONTROLS

[75] Inventors: Victor Charles Pierrot, III, Dubuque, Iowa; Garn Farley Penfold, East Moline, Ill.; Thomas Wilmer Meyers, Davenport, Iowa

[73] Assignee: Deere & Company, Moline, Ill.

[22] Filed: Apr. 26, 1971

[21] Appl. No.: 137,192

[52] U.S. Cl. .................................................144/2 Z
[51] Int. Cl. ..................................................A01g 23/08
[58] Field of Search ........................................144/3 D

[56] References Cited

UNITED STATES PATENTS 3,487,864   1/1970   Larson et al. .......................144/3 D

*Primary Examiner*—Gerald A. Dost
*Attorney*—H. Vincent Harsha, Harold M. Knoth, William A. Murray, John M. Nolan, Raymond L. Hollister, Jimmie R. Oaks and John O. Hayes

[57] ABSTRACT

A delimbing machine includes an elongate horizontal platform having a track along which a knife carriage is driven. The knives on the carriage are openable and closable for respectively receiving and encircling a tree stem to be delimbed. Mounted adjacent one end of the track is a retainer-ejector including a clamp arm swingably mounted on a swingable bed for selectively holding tree stems on the bed when the latter is in a delimbing position over the platform and for releasing the delimbed tree stems to one side of the platform when the bed in in a tree-eject position at one side of the platform. A boom-mounted grapple is operable for positioning a tree stem on the platform and in the open clamp and delimbing knives. The delimbing knife carriage drive includes a reversible hydraulic motor and the clamping and ejecting functions of the retainer-ejector are respectively accomplished by first and second double-acting hydraulic cylinders. Three solenoid-operated valves respectively control the operation of the hydraulic motor and cylinders and a delimbing cycle is commenced by manually switching electric current for energizing the appropriate solenoids for causing the clamp arm to close on a tree stem and for causing the knife carriage to be driven along the tree stem. Once the delimbing cycle is commenced, an electrical logic circuit automatically controls the three valves to return the carriage to its starting position after its delimbing run is finished and to eject the delimbed tree and return the retainer-ejector clamp arm and bed to respective conditions for receiving the next tree stem to be delimbed. An override circuit is provided to permit the control of the valve solenoids by manually-actuated switches.

3 Claims, 3 Drawing Figures

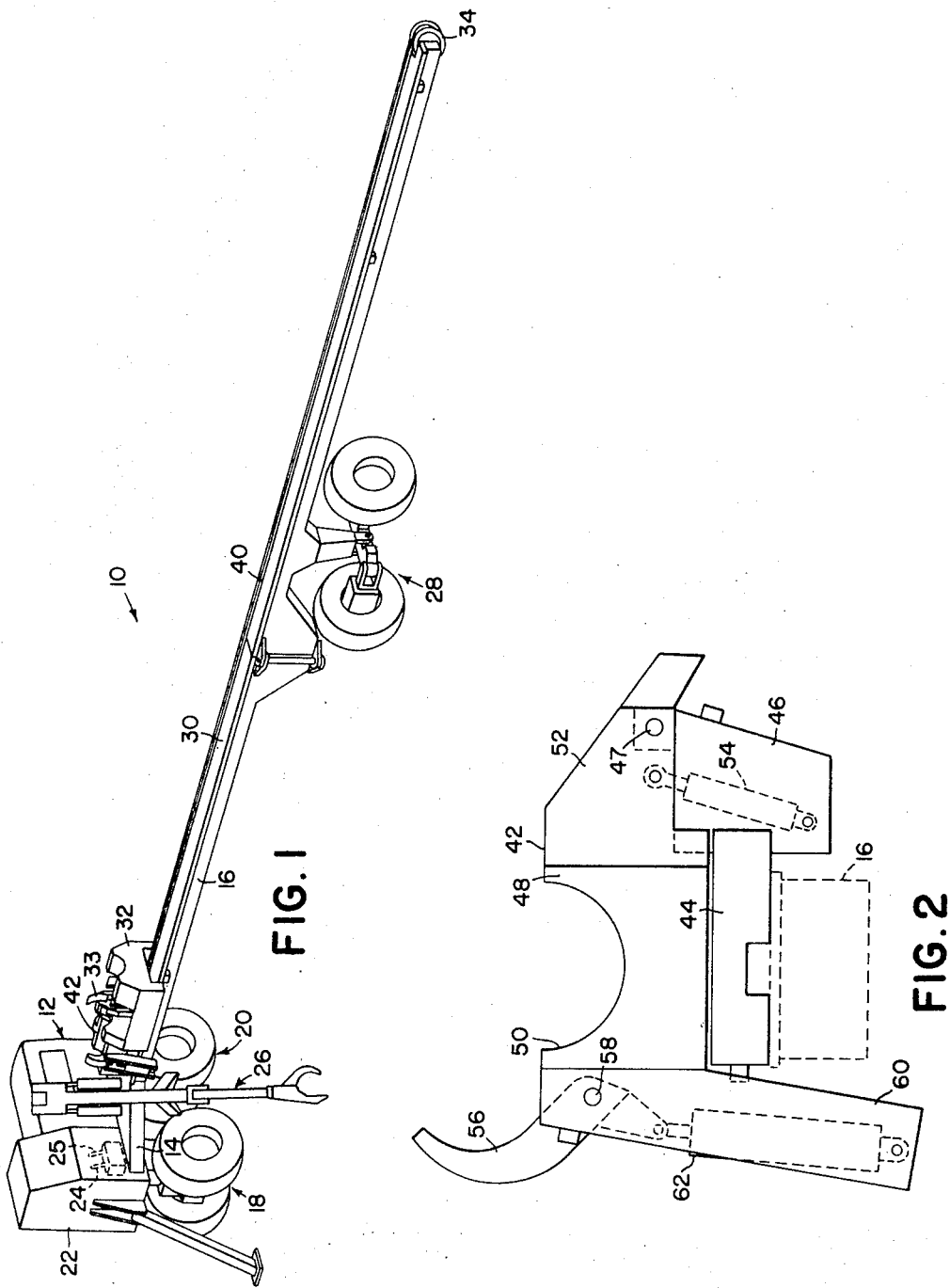

Patented May 8, 1973

INVENTORS

G. F. PENFOLD
T. W. MEYERS
V. C. PIERROT, III

DELIMBING MACHINE CONTROLS

BACKGROUND OF THE INVENTION

The present invention relates to a delimbing machine and more particularly relates to an improvement in a delimbing machine of the type disclosed in copending U. S. application Ser. No. 120,501 of French et al., filed Mar. 3, 1971, and having the same assignee as the present application.

The delimbing machine disclosed in the above-identified co-pending application includes a horizontal delimbing platform having a track along which a delimbing knife carriage is driven by a reversible hydraulic motor. A boom-mounted grapple is located at one end of the platform and is operable for elevating tree stems from the ground to a delimbing position on the platform, for holding the tree stems until they are delimbed, and then for ejecting the delimbed tree stems to one side of the platform. The boom-mounted grapple and the carriage are both operated through means of hydraulic motors which are controlled manually through means of a plurality of valves located at the operator's station.

One serious drawback found in the prior device was that the operator could not use the grapple to select the next tree stem to be delimbed until the previous stem had been delimbed and ejected and, even then, the operator was unable to devote his attention to the grapple operation until the delimbing knife carriage was returned to its beginning position.

Thus, the cycle time, the time spent between readying consecutive tree stems for delimbing, was found to be too long in the operation of the prior device.

SUMMARY OF THE INVENTION

According to the present invention there is provided a novel delimbing machine and more particularly there is provided a machine particularly designed for operating at an efficient delimbing cycle period.

An object of the invention is to provide a delimbing machine having a boom-mounted grapple for elevating a tree stem into delimbing position and to provide a retainer-ejector for holding the tree stem during delimbing and for ejecting the delimbed tree stem.

A further object is to provide a control system for automatically controlling the knife carriage drive and the retainer-ejector actuators, once the retainer-ejector mechanism is actuated to hold a tree and the carriage is actuated to begin delimbing, for finishing delimbing a tree stem and ejecting the same and for returning the carriage and the retainer-ejector to positions for receiving the next tree stem to be delimbed.

Another object is to provide a control system including lock-out means for preventing inadvertent manual actuation of the carriage and retainer-ejector motors while the control system is in the automatic mode.

Still another object is to provide a control system including override means for overriding automatic operation and permitting complete manual operation of the carriage and retainer-ejector mechanism.

These and other objects will become apparent from the ensuing description and the appended drawings.

BRIEF DESCRIPTION OF THE DRAWINGS

FIG. 1 is an overall perspective view of the delimbing machine in which the present control system invention is embodied and showing the placements of proximity switches on the delimbing platform.

FIG. 2 is an end view of the retainer-ejector showing the placements of proximity switches thereon.

DESCRIPTION OF THE PREFERRED EMBODIMENT

Figure 3:
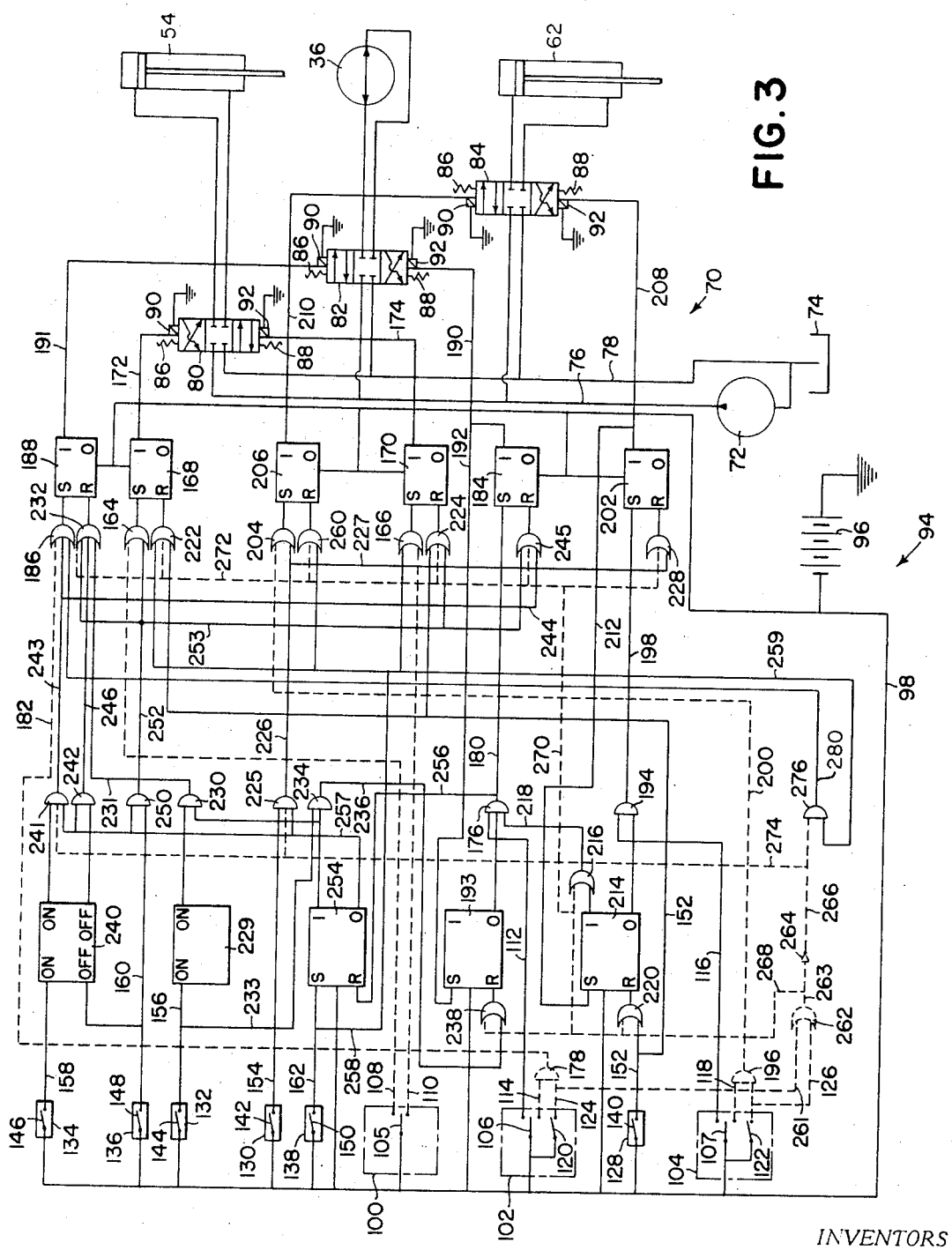
FIG. 3 is a schematic diagram of the control system showing conventional elements symbolically with the portion of the circuit for semi-automatically controlling delimbing apparatus being shown in solid lines and with the portion of the circuit for overriding automatic control being shown in dashed lines.

Referring now to the drawing, there is shown an elongate, generally T-shaped delimbing machine indicated in it entirety by the reference numeral 10. Forming the head of the machine 10 is a relatively short power unit 12 having a horizontal frame 14 and forming the leg of the machine 10 is a relatively long, horizontal delimbing platform 16 having one of its ends fixed to the frame 14.

The power unit 12 includes a pair of steerable drive-wheel assemblies 18 and 20 supportingly mounted under the opposite ends of the frame 14. Mounted on the frame 14 at one end thereof is an operator's station 22 having various controls for the machine 10 located thereat, only a pair of hand levers 24 and 25 being shown. Also mounted on the frame 14 is a conventional boom and grapple assembly 26 positionable by the selective actuation of a plurality of hydraulic cylinders (not shown).

The delimbing platform 16 includes a steerable drive-wheel assembly 28 located between its opposite ends. A guide rail 30 forms the top of the platform 16 and a delimbing knife carriage 32 is mounted for movement along the rail 30 between delimbing starting and ending locations respectively at the near and far ends of the platform 16 relative to the operator's station 22. The carriage 32 has a set of delimbing knives 33 mounted thereon for movement between open and closed positions respectively for receiving and encircling a tree stem to be delimbed. The carriage 32 is selectively driven between the starting and ending locations on the rail 30 by a drive including a pulley 34 mounted for rotation about a transverse horizontal axis at the far end of the platform 16 and a drive sprocket (not shown) similarly mounted adjacent the near end of the platform 16. A hydraulic motor 36 is connected to the drive sprocket in the usual manner. Connected to the end of the carriage 32 facing the operator's station 22, is one end of a drive chain (not shown), the latter extending about the drive sprocket and being long enough to permit the carriage 32 to move to the far end of the platform 16. Extending about the pulley 34 and having its opposite ends respectively connected to the other end of the chain and the end of the carriage 32 facing away from the station 22 is a length of cable 40.

Mounted on the plateform 16 adjacent the power unit 12 is a retainer-ejector 42. The retainer-ejector 42 includes a mounting pad 44 which is fixed to and overlies the platform 16. A bracket 46 extends leftwardly from the pad 44, as viewed from the station 22, and provides support for a horizontal pin 47, extending parallel to the length of the platform 16. A stem-receiving bed 48 having a semi-cylindrical receptacle 50 is swingably mounted on the pin 47, via a bracket 52 at its left side, for movement between a delimbing or stem-receiving position wherein the receptacle 50 opens upwardly and is centered above the platform 16 and a stem-ejecting position wherein the receptacle 50 opens leftwardly and is to the left of the platform 16. A double-acting hydraulic cylinder 54 is respectively pivotally connected at its opposite ends to the brackets 46 and 52 and is selectively extensible and retractable to swing the bed 48 between the stem-receiving and stem-ejecting positions. An arcuate clamp arm 56 is pivotally connected, as at pin 58, to a bracket 60 at the right side of the bed 48 for swinging movement between an unclamped position, to one side of the receptacle 50, permitting the passage of tree stems to and from the receptacle 50 and a clamped position disposed above the receptacle 50 for holding tress therein. A double-acting hydraulic cylinder 62 has its opposite ends respectively pivotally connected to the clamp arm 56 and the bracket 60 and is operative for swinging the clamp arm 56 between the clamped and unclamped positions.

A control system for controlling the carriage drive motor 36 and the bed and clamp arm cylinders 54 and 62 of the retainer-ejector 42 is shown in FIG. 3 and is designated in its entirety by the reference numeral 70. The control system 70 includes a pump 72 and a reservoir 74 respectively connected to pressure and return lines 76 and 78, each of which are in turn connected to three three-position, four-way direction control valves 80, 82 and 84, respectively connected to the cylinder 62, the motor 36 and the cylinder 54. The valves 80, 82 and 84 are each shown in a neutral position to which they are biased by pairs of springs 86 and 88 acting on their opposite ends and in which they block flow to and from the motor 36 and the cylinders 54 and 52. As viewed in FIG. 3, a pair of solenoids 90 and 92 are respectively mounted at the upper and lower ends of each of the valves 80, 82 and 84. The upper solenoids 90 are selectively energized for shifting the valves 80, 82 and 84 upwardly from their neutral positions to first active positions for respectively causing the cylinder 62 to be extended for swinging the bed 48 to the eject position, for causing the motor 36 to be reversely driven for advancing the carriage 32 toward the beginning location on the rail 30 and for causing the cylinder 54 to be retracted for swinging the clamp arm 56 to the unclamped position. Similarly, the lower solenoids 92 are selectively energized for shifting the valves 80, 82 and 84 downwardly from their neutral positions to second active positions for respectively causing the cylinder 62 to be retracted for swinging the bed 48 to the stem-receiving position, for causing the motor 36 to be forwardly driven for moving the carriage 32 toward the ending location on the rail 30 and for causing the cylinder 54 to be extended for swinging the clamp 56 to the clamped position.

The control system 70 includes an electrical system 94 for selectively energizing the solenoids 90 and 92. As is fully described below, the system 94 includes a plurality of AND and OR gate logic circuits coupled to a plurality of bistable flip-flop circuits for correlating manually and automatically initiated input signals for controlling the proper sequence of operation of the carriage 32, the bed 48 and the clamp arm 56.

The AND and OR gate circuits and the flip-flop circuits are all conventional circuits and are illustrated in block form. The AND gates may be of any type having a plurality of input connections and a single output connection and permitting electrical flow between the input and output connections only when all of the input connections are energized. The OR gates likewise may be of any type having a plurality of input connections and a single output connection and permitting electrical flow between the input and output connections when one or more of the input connections are energized. The flip-flop circuits may be of any type having "set" and "reset" inputs S and R and "set" and "reset" outputs 1 and 0 and operable for alternately connecting a source of electrical energy to the "set" and "reset" outputs 1 and 0, respectively in response to electrical signals being connected to the "set" and "reset" input connections S and R.

The electrical system 94 may be optionally placed in a manual mode, wherein the solenoids 90 and 92 are selectively energized entirely in response to operator initiated input control signals, or, in a semi-automatic mode wherein the solenoids 90 and 92 are selectively energized in response to operator-initiated control signals in conjunction with control signals initiated automatically by the carriage 32, the bed 48 and the clamp arm 56 at critical operational locations along their paths of movement.

The electrical system 94 is normally operated in the semi-automatic mode and a main portion of the system 94 is required for semi-automatic operation and is illustrated in solid lines. A secondary portion of the electrical system 94 is selectively energized for overriding or disabling all automatically initiated input signals and for enabling additional input signals to be initiated by the operator to permit the solenoids to be entirely manually controlled.

Referring in more detail to the electrical system 94, there is provided a source of electrical energy, shown here as a battery 96, connected to a supply line 98. Three manually-operated switches 100, 102 and 104 respectively for controlling the bed 48, the carriage 32 and the clamp arm 56 have input leads connected to the supply line 98. The control switches 100, 102 and 104 respectively include three-position switch elements 105, 106 and 107 which are selectively movable to opposite sides of central "off" positions for respectively energizing bed-control input lines 108 and 110, carriage-control input lines 112 and 114 and clamp-arm-control input lines 116 and 118. In addition, the switches 102 and 104 respectively include two-position switch elements 120 and 122 which are movable to one side of respective "off" positions for respectively energizing override-control input lines 124 and 126.

In addition to the three manually-operated switches 100, 102, 104, a pair of bed-operated switches 128 and 130, three carriage-operated switches 132, 134 and 136, and a clamp-arm-operated switch 138 also have input leads connected to the supply line 98. While the switches 128 to 138 may be of any suitable type, they are preferably conventional dry-reed proximity switches of a type having a switch element magnetically balanced to an open position and closable by moving an actuator through the magnetic field to disrupt the balance. Thus, the switches 128 to 138 respectively include normally open switch elements 140, 142, 144, 146, 148 and 150 which, when closed respectively, energize apparatus position-indicating input lines 152, 154, 156, 158, 160 and 162.

The switches 128 to 138 are mounted on the delimbing machine 10 at locations chosen such that the respective switch elements of the switches will be caused to close to energize the position input lines when the bed 48, the carriage 32 or the clamp arm 56 reach critical positions in their respective operation. Specifically, the bed-controlled switches 128 to 130 are respectively mounted on the bed-mounting pad 44 and on the bracket 46 at locations whereat their respective switch elements 140 and 142 are respectively closed by the bed brackets when the bed 48 nears the tree-stem-receiving and ejecting positions. The carriage-controlled switches 132 and 136 are respectively mounted adjacent the near and far ends of the platform 16 at positions so as to have their respective switch elements 144 and 148 closed by the carriage 32 as it leaves or approaches the ending location. The carriage-controlled switch 134 is mounted on the platform 16 close to the switch 136 so as to have its switch element 146 closed by the carriage 32 as the carriage approaches or leaves the switch 136. The clamp-arm-controlled switch 138 is mounted on the bed bracket 60 at a position so as to have its switch element 150 closed by the clamp arm 56 as the arm approaches the unclamped position.

The bed-control input lines 108 and 110 are respectively connected to one of a pair of inputs of each of a pair of OR gates 164 and 166 having their outputs respectively connected to the "set" inputs S of a pair of bed-control terminal flip-flops 168 and 170 having their "set" outputs 1 respectively connected, via control lines 172 and 174, to the solenoids 90 and 92 of the bed-control valve 80.

The carriage-control input lines 112 and 114 are respectively connected to one of a pair of inputs of each of a pair of AND gates 176 and 178 respectively operative for selectively locking out signals for causing the carriage 32 to be driven forwardly and reversely. The outputs of the AND gates 176 and 178 are respectively connected, via input lines 180 and 182, to the "-set" input S of a terminal carriage-control flip-flop 184 and to a first of three inputs of an OR gate 186 having its output connected to the "set" input S of a second terminal carriage-control flip-flop 188. The flip-flops 184 and 188 have their "set" outputs 1 respectively connected, via control lines 190 and 191, to the solenoids 92 and 90 of the carriage-control valve 82. A feedback line 192 interconnects the control line 190 with the "set" input S of a flip-flop 193 for coordinating signals for causing the carriage 32 to be driven forwardly. The "set" output 1 of the flip-flop 193 is not connected to anything.

Similarly, the clamp-arm-control input lines 116 and 118 are respectively connected to one of a pair of inputs of each of a pair of AND gates 194 and 196 respectively operative for selectively locking out signals for causing the clamp arm 56 to be swung to the clamped and unclamped positions. The output connections of the AND gates 194 and 196 are respectively connected, by input lines 198 and 200 to the "set" input of a terminal clamp-arm-control flip-flop 202 and one of a pair of inputs of an OR gate 204 having its output connected to the "set" input S of a second terminal clamp-arm-control flip-flop 206. The flip-flops 202 and 206 have their "set" outputs 1 respectively connected, via control lines 208 and 210 to the solenoids 92 and 90 of the clamp-arm-control valve 84. A feedback line 212 interconnects the control line 208 with the "set" input S of a flip-flop 214 for coordinating signals for causing the clamp arm 56 to be swung to the unclamped position. The "set" output 1 of the flip-flop 214 is connected to a first of a pair of inputs of an OR gate 216 having its output connected, via a line 218, to a second of the three inputs of the AND gate 176.

The bed-position input line 152 includes a plurality of branches respectively connected to a first of a pair of inputs of a pair of OR gates 220 and 222 and to a first of three inputs of an OR gate 224, the OR gates 220, 222 and 224 respectively having their outputs connected to the "reset" inputs R of the flip-flops 214, 168 and 170. The "reset" output 0 of the flip-flop 214 is connected to a second of the pair of inputs of the AND gate 194 and the "reset" outputs 0 of the flip-flops 168 and 170 are not connected to anything.

The bed-position input line 154 is connected a first of three inputs of an AND gate 225 having its output connected by lines 226 and 227, to a second of the pair of inputs of the OR gate 204 and to a first of a pair of inputs of an OR gate 228 having its output connected to the "reset" input R of the flip-flop 202, the reset output 0 of the flip-flop 202 not being connected to anything.

The carriage-position input line 156 is connected to an ON input of a first timer shown in block form at 229. The timer 229 is a delay type and includes an ON output to which electrical current is permitted to flow a predetermined time after the ON input is energized. The ON output of the timer 229 is connected to a first of a pair of inputs of an AND gate 230 having its output connected, by a line 231, to a first of four inputs of an OR gate 232 having its output connected to the "reset" input R of the flip-flop 188. It is to be noted that the "reset" output 0 of the flip-flop 188 is not connected to anything. The carriage-position input line 156 is connected, via a line 233, to a first of a pair of inputs of an AND gate 234 having its output connected, via a line 236, to a first of a pair of inputs of an OR gate 238 having its output connected to the "reset" input R of the flip-flop 193. The "reset" output 0 of the flip-flop 193 is connected to the last of the three inputs of the AND gate 176.

The carriage-position input lines 158 and 160 are respectively connected to the ON and OFF inputs of a second timer 240 having ON and OFF outputs. The timer 240 is normally in an OFF condition wherein electrical current is permitted to flow between the OFF input and output, and is switched, in response to the ON input being energized, to an ON condition wherein electrical current is permitted to flow between the ON input and output for a predetermined time after which the ON input is switched into connection with the OFF output. The ON and OFF outputs of the timer 240 are respectively connected to a first of a pair of normal inputs of an AND gate 241, operative for locking out the signal from the timer 240, and a first of a pair of inputs of an AND gate 242. The AND gate 241 has its output connected, via lines 243 and 244 to a second of the three inputs of the OR gate 186 and to a first of three inputs of an OR gate 245 having its output connected to the "reset" input R of the flip-flop 184. The AND gate 242 has its output connected via a line 246 to a second of the four inputs of the OR gate 232. The input line 160 is additionally connected to a first of a pair of inputs of an AND gate 250 having its output connected, via lines 252 and 253, to a second of the pair of inputs of the OR gate 164, to a third of the four inputs of the OR gate 232, and to a second of the three inputs of the OR gates 224 and 245.

The clamp-arm-position input line 162 is connected to the "set" input of a flip-flop 254 operative for coordinating signals for causing the clamp arm 56 to be swung to the unclamped position. The "set" output 1 of the flip-flop 254 is connected to a second of the pair of inputs of the AND gate 234. A feedback line 256 interconnects the carriage-control input line 180 with the "reset" input R of the flip-flop 254 and the "reset" output 0 of the flip-flop 254 is connected, by a branched line 257 to a second of the three inputs of the AND gates 255 and 241 and of the pair of inputs of the AND gates 242 and 250. The input line 162 is additionally connected, via lines 258 and 259 to a third of the three inputs of the OR gate 222, to a first of a pair of inputs of an OR gate 260 having its output connected to the "reset" input R of the flip-flop 206, and to a second of the pair of inputs of the OR gate 166.

It is to be noted that the source of energy which is switched between the "set" and "reset" outputs of the various control and coordinating flip-flops is here shown as being derived from the source line 98, which is connected to each of the flip-flops.

It is also to be noted that, for a purpose to be described below, that the "set" inputs of the control flip-flops 184, 188, 202 and 206 and the "reset" inputs of the control flip-flops 168 and 170 and of the coordinating flip-flops 193, 214 and 254 are the respective dominant inputs of the flip-flops so that when electrical signals co-exist at both inputs of the flip-flops, the dominant input will determine the state of the flip-flops.

The override-signal inputs lines 124 and 126 are selectively energized for respectively enabling manual controls for reversing the carriage 32 and for swinging the clamp arm 56 to the unclamped position. The energizing of the input line 126 also operates to disable all automatic control of the carriage 32, bed 48 and clamp arm 56. Specifically, the input line 124 is connected to a second of the pair of inputs of the AND gate 178 and is connected, by a line 261, to a first of a pair of inputs of an override signal coordinating OR gate 262. The input line 126 is respectively connected to second ones of the pairs of inputs of the AND gate 196 and the OR gate 262. The output of the OR gate 262 is connected to a line 263 which is connected to the input of a signal inverter 264. Intersecting the line 263 between the OR gate 262 and the inverter 264 is a line 268, which is connected to second ones of the pairs of inputs of the OR gates 220 and 238. The line 268 is in turn connected, by a line 270, to a second of the pair of inputs of the OR gate 216 and the line 270 is in turn connected, by a line 272, to second ones of the pairs of inputs of the OR gates 222, 228 and 260, to third ones of the three inputs of the OR gates 224 and 245 and to a fourth input of four inputs of the OR gate 232. The output of the inverter 264 is connnected, via a line 274, to special override inputs of the AND gates 225 and 241. The output of the inverter 264 is additionally connected to a special override input of an AND gate 276 having its output connected via a line 280 to a third of the three inputs of the OR gate 186. The AND gate 276 has a single normal input connected to the line 259.

In operation, the delimbing machine 10 is first driven to a location alongside a tree or a pile of trees on the ground. The carriage 32, bed 48 and clamp arm 56 are then manually actuated, in a manner described below, to place them in the conditions illustrated wherein the carriage 32 is in the beginning location at the near end of the platform 16, the bed is in the tree-stem-receiving position and the clamp arm 56 is in the unclamped position. The operator then controls the boom and grapple assembly 26 to grasp a selected tree to be delimbed and position the latter on the platform 16 with its stem received in the receptacle 50 of the bed 48 and in the open knives 33 of the carriage 32.

At this point, it should be noted that the control system 70 is in the condition illustrated wherein all of the switch elements are open and the control valves are in their neutral positions. Also, the signal-coordinating flip-flops 193, 214 and 254 are respectively in their "reset", "reset" and "set" states and, thus, connect the battery 96, through the supply line 98, to one of the pair of inputs of the AND gates 176, 194 and 234 which are all gated OFF since all of their respective inputs are not energized. The terminal flip-flops 168, 170, 184, 188, 202 and 206 are all in their "reset" states wherein the supply line 98 is connected to their respective "reset" outputs 0.

To commence a semi-automatically controlled delimbing cycle, the operator closes the switch element 107 of the clamp-control switch 104 so as to connect the source supply line 98 to the input line 116 to energize the latter. The electrical energy in the line 116 energizes the remaining input of the AND gate 194 and gates the latter ON and thus passes through the line 198 to the "set" input S of the clamp-arm-control flip-flop 202. The electrical signal switches the flip-flop 202 to its "set" state and the source of electrical energy in the line 98 is thus connected, via the "set" output 1 and the control line 208, to energize the solenoid 92 of the clamp-arm cylinder control valve 84, to shift the valve 84 to connect the source of fluid from the pump 72 and to connect the reservoir to the clamp-arm cylinder 62 to cause the latter to extend and swing the arm 56 to the closed position wherein it clamps the tree stem against the receptacle 50 of the bed 48.

When the control line 208 is energized, an electrical signal is sent through the feedback line 212 to the "set" input of the signal-coordinating flip-flop 214. This signal causes the flip-flop 214 to switch to its "set" state to disconnect the supply line 98 from the "reset" output 0 and connect it to the "set" output 1. Thus, the "reset" output 0 of the flip-flop 214 is de-energized resulting in one of the inputs of the AND gate 194 also being de-energized and the AND gate 194 being gated OFF. This disables further operator actuation, during the remainder of the delimbing cycle, of the clamp arm 56 toward its closed position as might be done by the inadvertent closing of the switch element 107. The electrical energy at the "set" output 1 of the flop-flop 214 energizes one input of and passes through the OR gate 216 and energizes a second of the three inputs of the AND gate 176, which remains gated OFF.

The operator then connects the carriage-control input line 112 to the supply line 98 by closing the switch element 106 of the carriage-control switch 102. The line 112 connects electrical energy to the remaining input of the AND gate 176, thus gating it ON. The energy then travels to the line 180 from whence it branches through the line 256 to the "reset" input R of the control-signal-coordinating flip-flop 254 and switches the latter to its "reset" state thus disconnecting the supply line 98 from the "set" output 1 and connecting it to the "reset" output 0. Since the "set" output 1 of the flip-flop 254 is de-energized, one of the inputs of the AND gates 230 and 234 are also de-energized. Electrical energy from the energized "reset" output 0 of the flip-flop 254 passes through the line 257 and energizes one of the inputs of each of the AND gates 225, 241, 242 and 250. The electrical energy in the line 180 also travels to the "set" input S of the carriage-control flip-flop 184. The electrical energy switches the flip-flop 184 to its "set" state and the source of electrical energy in the line 98 is thus connected, via the "set" output 1 and the control line 190, to energize the solenoid 92 of the carriage motor-control valve 82 to shift the valve 82 to connect the pump 72 and the reservoir 74 to the motor 36 to cause the motor to drive forwardly and cause the carriage 32 to be advanced forwardly on the rail 30 toward the far end of the platform 16. When the control line 190 is energized, an electrical signal is sent through the feedback line 192 to the "set" input S of the control-signal-coordinating flip-flop 193. This signal causes the flip-flop 193 to switch to its "set" state to disconnect the supply line 98 from the "reset" output 0 and connect it to the "set" output 1. Thus, the "reset" output 0 of the flip-flop 193 is de-energized resulting in one of the inputs of the AND gate 176 also being de-energized causing the AND gate 176 to be gated OFF to disable further operator actuation, during the delimbing cycle, of the carriage 32 toward the far end of the platform 16 as might be done by inadvertent closing of the switch element 106. It is to be noted that the flip-flop 193 is now OFF since its "set" output 1 is not connected to anything.

It is here noted that the flip-flops 214 and 193 act to coordinate the clamp-arm and carriage-control signals, respectively initiated by energizing the input lines 116 and 112, such that the clamp arm 56 must be actuated to close before the carriage 32 can be actuated to move forwardly toward the far end of the platform 16. This is due to the fact that the feedback signal from the clamp-arm-control line 208 is necessary for causing the AND gate 176 to be in condition for being gated ON by energizing the input line 112.

As the carriage 32 proceeds toward the far end of the platform 16, it first causes the switch element 144 of the proximity switch 132 to close and energize the input line 156. The electrical signal in the line 156 passes through the ON input and outputs of the timer 229 to one of the inputs of the AND gate 230, but since the other input of the AND gate 230 is not energized, the signal is stopped and has no effect.

As the carriage 32 is finishing its delimbing pass and approaches the far end of the platform 16, it first encounters the switch element 146 of the proximity switch 134 and causes the element 146 to close and energize the input line 158. The electrical energy in the line 158 energizes and starts the timer 240 which permits the energy to pass through its ON output to energize another of the inputs of the AND gate 241 thus gating the latter ON to pass the electrical energy to energize one input of the OR gate 186 through which the electrical signal passes to the "set" input of the carriage-control flip-flop 188. This signal causes the flip-flop 188 to switch to its "set" state whereby the electrical energy in the source line 98 is connected via the "set" output 1 and the control line 191, to actuate the solenoid 90 of the motor-control valve 82 to shift the valve 82 to reverse the flow of fluid to the motor 36 to cause the forward motion of the carriage 32 to be braked or slowed. When the timer 240 has timed out, it operates to switch its ON input into connection with its OFF output. The electrical energy at the OFF output completes the energizing of the inputs of, and causes the AND gate 242 to be gated ON to pass the electrical energy via the line 246 to a first input of and through the OR gate 232 to the "reset" input R of the flip-flop 188 to cause the latter to switch back to its "reset" state, thus de-energizing the solenoid 90 of the carriage-motor-control valve 82. The centering springs 86 and 88 then return the valve 82 to its neutral position.

The slowed and stopping carriage 32 then causes the switch element 148 of the proximity switch 136, at the far end of the platform 16, to be closed to energize the input line 160. The electrical energy in the line 160 passes to the OF input of the timer 240 and causes it to switch to the OFF state, if it has not already timed out, with the energy at the OFF output functioning as before. The energy in the line 160 also completes the energizing of the inputs of, and causes the AND gate 250 to be gated ON to pass electrical energy through the line 252 to one of the inputs of the OR gate 164; from whence the energy passes to the "set" input S of the bed-control flip-flop 168. The energy at the "set" input S of the flip-flop 168 causes the latter to switch to its "set" state whereby the electrical energy in the source line 98 is connected, via the "set" output 1 and the control line 172 to actuate the solenoid 90 of the bed-cylinder-control valve 80 to shift the latter so as to connect the bed-cylinder 54 to the pump 72 and reservoir 74 to cause the cylinder 54 to extend and swing the bed 48 toward the tree-eject position.

As the bed 48 nears the eject position, it causes the switch element 142 of the switch 130 to close and energize the input line 154. The electrical energy in line 154 completes the energizing of the inputs of and causes the AND gate 225 to gate ON whereby the energy is passed through the gate 225 to the lines 226 and 227 and energizes one of the inputs of and passes through the OR gates 204 and 228 to the "set" and "reset" inputs of the flip-flops 206 and 202, respectively. The energy at the "set" input S of the flip-flop 206 causes the latter to switch to its "set" state whereby the electrical energy in the source line 98 is connected via the "set" output 1 and the control line 210, to actuate the solenoid 90 of the clamp-arm cylinder-control valve 84 to shift the latter to cause the pump 72 and the reservoir 74 to be connected to the clamp-arm cylinder 62 such as to cause the cylinder to retract to swing the clamp arm 56 to its unclamped position to permit the delimbed tree stem to drop to the ground.

When the clamp arm 56 is opened, it connects the source line 98 to the input line 162 by causing the switch element 150 of the switch 138 to close. The electrical energy in the line 162 passes to the "set" input S of the flip-flop 254 and causes the latter to switch to its "set" state to disconnect the source line 98 from the "reset" output 0 and connect it to the "set" output 1. Thus, the "reset" output 0 is de-energized and, of course, the respective inputs of the AND gates 225, 241, 242 and 250 connected to the output 0 and also de-energized. The energy at the "set" output 1 of the flip-flop 254 passes to and energizes one of the inputs of each of the AND gates 230 and 234. The energy in the line 162 also passes via the lines 258 and 259, to one of the inputs of and through the OR gates 166, 222 and 260 to respectively energize the "set", "reset" and "reset" inputs of the bed control flip-flops 170 and 168 and the clamp-arm-control flip-flop 206. The electrical energy at the "set" and "reset" inputs S and R respectively of the flip-flops 170 and 168 causes the clip-flop 168 to shift to its "reset" state whereby energy to the solenoid 90 of the valve 80 to shut off and causes the flip-flop 170 to shift to its "set" state whereby the energy in the source line 98 is connected via the "set" output 1 and the control line 174 and actuates the solenoid 92 of the bed-cylinder-control valve 80 to shift the latter to connect the pump 72 and reservoir 74 to the bed cylinder 54 so as to cause the latter to retract and swing the bed 48 back to the tree-stem-receiving position.

Energy in the line 259 additionally passes to the AND gate 276, which is thus gated ON to connect the energy, via the line 280, and the OR gate 186 to the "set" input S of the flip-flop 188. The electrical energy at the "set" input S of the flip-flop 188 causes the latter to shift to its "set" state whereby the electrical energy in the source line 98 is connected via the "set" output 1 and the control line 191 and actuates the solenoid 90 of the carriage-motor-control valve 82 to shift the valve 82 to connect the pump 72 and reservoir to the motor 36 such that the latter is caused to be driven in reverse to in turn cause the carriage 32 to be advanced toward its beginning location at the near end of the platform 16.

The electrical energy at the "reset" input R of the flip-flop 206 causes the latter to shift to its "reset" state and connect the source line 98 to the "reset" output 0. The solenoid 90 of the clamp-arm-control valve 84 is thus de-energized and the control valve 84 is returned to its neutral position by the springs 86 and 88.

As the carriage 32 returns to its beginning location, it first causes the switch element 146 of the proximity switch 134 to be closed to energize the input line 158. Again, the signal passes through the timer 240, as described before, however, the signal is now blocked at the AND gate 241 since the flip-flip 254 is now in its "-set" state and that input of the AND gate 241 which is connected to the "reset" output of the flip-flop 254 is deenergized. Next, as the carriage 32 approaches the near end of the platform 16, it causes the switch element 144 of the proximity switch 132 to be closed to energize the input line 156 and the ON input of the timer 229. After a predetermined delay, the timer 229 times out and connects the energy in line 156 with its ON output, which energy completes the energizing of the inputs of and gates the AND gate 230 ON and passes therefrom via the line 321 to an input of the OR gate 232 through which it passes to the "reset" input of the carriage-control flip-flop 188. Thus, the signal switches the flip-flop 188 to its "reset" state and connects the source line 98 to the "reset" output 0. This, of course, results in the solenoid 90, of the carriage-motor-control valve 82, being de-energized and the control valve 82 is returned to its neutral position by the springs 86 and 88. Electrical energy in the input line 156 also passes, via the line 233, and completes the energizing of the inputs of and gates ON and AND gate 234 from whence it passes via the line 236 and energizes one of the inputs of, and passes through, the OR gate 238 whereby the "reset" input of the signal-coordinating flip-flop 193 is energized causing the flip-flop 193 to switch to the "reset" state and connect the energy in the source line 98 to the "reset" output 0, as was the case at the beginning of the delimbing cycle.

In the meantime, the bed 48 has been returning towards the stem-receiving position under the action of the cylinder 62 which has been retracting. When the bed 48 is back to the tree-stem-receiving position, it causes the switch element 140 of the switch 128 to close and energize the input line 152. The electrical energy in the line 152 energizes one input of and passes through the OR gate 229 to the "reset" input R of the control-signal-coordinating flip-flop 214 and returns the latter to its beginning "reset" state. The electrical energy in the line 152 also passes to one of the inputs of and through the OR gates 222 and 224 to the "reset" inputs of the bed-control flip-flop 168 and 170 thus returning the flip-flops 168 and 170 to their beginning "reset" states.

During the automatic portion of the delimbing cycle, the operator again operates the boom and grapple assembly 26 to select the next tree to be delimbed and when the carriage 32, bed 48 and clamp arm 56 are back in their beginning locations, the operator immediately properly places the tree on the platform 16 and begins another delimbing cycle.

The operator may wish to exclusively manually control the operation of the carriage 32, the bed 48 and the clamp arm 56 in which case he must close one or the other or both of the override switch elements 120 and 122, contained respectively in the carriage- and clamp-control switches 102 and 104, to override the apparatus-controlled proximity switches 128 to 138 as described below.

Assuming the operator wishes to manually control both the carriage 32 and the clamp arm 56, he closes the switch elements 120 and 122 to energize the override-signal input lines 124 and 126. The electrical energy in the lines 124 and 126 respectively energizes one of the inputs of the AND gates 178 and 196. The operator can then cause the carriage motor 32 to drive in reverse by closing the switch element 106 to energize the input line 114, which energy gates ON and passes through the AND gate 178 to the line 182 and energizes one of the three inputs of and passes through the OR gate 186 to the "set" input S of the carriage-control flip-flop 188 whereby the latter is switched to the "set" state and the electrical energy in the source line 98 is connected to the control line 191. Since the "set" input of the flip-flop 188 is dominant, signals arriving at the "reset" input of the flip-flop due to the timer 240 and carriage-controlled switch 138 will have no effect on the state of the flip-flop 188. The carriage motor 32 can be manually controlled to advance forwardly in the same manner described above with reference to semi-automatic control of the delimbing apparatus.

Similarly, the operator can cause the clamp arm 56 to be swung to its unclamped position by closing the switch element 107 to energize the line 118. The electrical energy in the line 118 energizes the other input of and gates ON and AND gates 196 which permits passage of the energy, via the line 200, to energize one input of the OR gate 204 which permits passage of the energy to the "set" input S of the clamp-arm-control flip-flop 206, to switch the latter to the "set" state and connect the source line 98 to the control line 210. Since signals arriving at the "reset" input are subordinate to those arriving at the "set" input of the flip-flop 206, the closing of the switch 138 will not affect the operation. The clamp arm 56 can be controlled to swing toward the clamped position by closing the switch element 107 to energize the input line 116 in the manner set forth above in reference to the semi-automatic control of the delimbing apparatus.

Electrical energy for overriding other automatic functions of the system passes through the energized lines 124 and 126 to the inputs of and passes through the OR gate 262 and is connected, via the lines 263 and 268, to and energizes one of the two inputs of the OR gates 220 and 238 through which the energy passes to respectively energize the "reset" inputs R of the control-signal-coordinating flip-flops 214 and 193, thus placing the latter in their "reset" states and connecting the source line 98 to their respective "reset" outputs 0. Since the "reset" inputs of the flip-flops 214 and 193 are dominant, subsequent energizing of their "set" inputs through means of the feedback lines 212 and 192, respectively, has no effect. The electrical energy in the line 268 also passes through the line 270 and energizes one of the two inputs of and passes through the OR gate 216 to one of the three inputs of the AND gate 176. Thus, the feedback signal from the clamp-arm-control line 208 is not necessary as a condition precedent to the operator commencing operation of the carriage 32.

Electrical energy in the line 270 also passes through the line 272 and energizes one of the inputs of the OR gates 232, 222, 260, 224, 245 and 228 through which the energy passes to respectively energize the "reset" inputs R of the carriage-control flip-flop 188, the bed-control flip-flop 168, the clamp-control flip-flop 260, the bed-control flip-flop 170, the carriage-control flip-flop 184 and the clamp-control flip-flop 228. Thus, no current passes from the flip-flops and the valves 80, 82 and 84 are neutralized until the carriage- and clamp-control switches 106 and 107 are closed as described above in which case the signal at the "set" inputs of the flip-flops dominates the signal at the flip-flop "reset" inputs.

The electrical energy in the line 263 also passes through the inverter 264 which passes an inverted signal, via the lines 266 and 274, to the override inputs of the AND gates 241 and 225 to respectively disable the signals caused by the closing of the switch elements of the carriage- and bed-controlled switches 134 and 130.

The inverted signal from the inverter 264 also passes via the line 266 to the override input of the AND gate 276 and blocks the gate 276 from passing a signal when the line 259 is energized by the closing of the switch element of the clamp-controlled switch 138. Thus, the closing of the clamp-controlled switch 138 has no effect on the carriage-control flip-flop 188 and the carriage motor 36 is not reversed as is the case when the system 94 is in the semi-automatic mode.

Normally, the operator will manually control the bed 48 only during emergencies or for maintenance and the like.

If the operator desires to manually control the bed 48, he may do so without actuating either of the override-switch elements 120 or 122. The switch element 105 of the bed-control switch 100 is merely closed to either energize the line 108 or the line 110 for respectively causing the bed 48 to be swung toward the eject position or toward the tree-stem-receiving position.

We claim:

1. In a delimbing machine of the type including a delimbing knife carriage mounted for forward and rearward movement along a track respectively from a delimbing beginning to a delimbing ending position and back again, the carriage being movable by a drive including a rotary, reversible hydraulic motor having first and second work ports arranged such that the motor will be placed in a neutral mode when both work ports are blocked, in a first active mode for driving the carriage forwardly when the first and second work ports are respectively connected to a source of fluid pressure and a reservoir and in a second active mode for driving the carriage rearwardly when the second and first ports are respectively connected to the source of fluid pressure and the reservoir, a clamp means including a frame carrying a gripping means and being mounted for movement between a delimbing position adjacent the first location and an ejecting position to one side of the track, the frame being movable by a first extensible and retractable hydraulic actuator means having first and second work port means arranged such that the actuator means will be placed in a neutral mode when both port means are blocked, in a first active mode for moving the frame to the eject position when the first and second port means are respectively connected to the source of fluid pressure and the reservoir and in a second active Mode for retaining the frame to the delimbing position when the second and first port means are respectively connected to the source of fluid pressure and the reservoir, the gripping means being mounted for movement between an open tree stem receiving or releasing position and a closed tree stem securing position; the gripping means being movable by a second extensible and retractable hydraulic actuator means having first and second work port means arranged such that the actuator means will be placed in a neutral mode when both work port means are blocked, in a first active mode for moving the gripping means to the open position when the first and second work port means are respectively connected to the source of fluid pressure and the reservoir and in a second active mode for moving the gripping means to the closed position when the second and first work port means are respectively connected to the source of fluid pressure and the reservoir; and first, second and third normally neutral, shiftable valves respectively connected to the motor and first and second actuator means and connected to the source of fluid pressure and the reservoir, each of said first, second and third valves being shiftable among neutral and first and second active positions for respectively placing said motor and first and second actuator means in their corresponding neutral, first active and second active modes, an improved electrical control means for selectively controlling the shifting of said valves among their neutral and first and second active positions, comprising: first and second solenoid means connected to each valve and being selectively energizable for respectively shifting the associated valve to its first and second active positions; a logic circuit means having a separate output connections joined to each solenoid; said logic circuit means including power input connection means; a source of electrical current being connected to said power input connection means; said logic circuit means including electrical signal responsive switching means for selectively connecting or blocking said power input connection means to or from said output connections; said logic circuit means including a plurality of control signal input connection means connected to said switching means; a plurality of normally open input signal switch means including manually closeable switch means being located between and connected to said control signal input connection means and said source of electric current; said manually closeable switch means including first and second manual switch means respectively closeable for commencing a delimbing cycle by connecting an electrical signal to said switching means for energizing the latter to connect said source of current to said second solenoid of said third valve for placing the second actuator means in its second active mode and by energizing said switching means for connecting said source of current to said first solenoid of said first valve for placing the motor in its first active mode; said input signal switch means also including a first carriage-position-responsive-switch closeable, upon said carriage reaching a position adjacent said ending position, for connecting a signal to said switching means for energizing the latter to block the source of current from the first solenoid of said first valve for placing the motor in its neutral condition and for concurrently energizing the switching means to connect the source of current to the first solenoid of the second valve for placing the first actuator means in its first active mode; said input signal switch means further including a first frame-position-responsive-switch closeable upon the frame reaching said eject position for connecting a signal to said switching means for energizing the latter to connect the source of current to the first solenoid of the third valve for placing the second actuator means in its first active mode; a first gripping means-position-responsive-switch closeable upon said gripping means reaching said open position for connecting a signal to said switching means for energizing the latter to connect the source of current simultaneously to the second solenoid of the first valve for placing the motor in its second active mode and to the second solenoid of the second valve for placing the first actuator means in its second active mode; a second carriage position-responsive-switch closeable upon said carriage reaching a location adjacent said beginning position for connecting a signal to said switching means for energizing the latter to disconnect the source of current from the second solenoid of the first valve for placing the motor in its neutral mode; and said logic circuit means including feedback signal means connected between said second solenoid of the third valve and the switching means for preventing the latter from being energized to connect the source of current to said first solenoid of the first valve before the energization of the second solenoid of the third valve.

2. The delimbing machine defined in claim 1 wherein said input signal switch means includes a third carriage position responsive switch closeable, upon said carriage reaching a second location proximate to said ending position but more remote therefrom than said first location, for connecting a signal to said switching means for energizing the latter to switch the connection of the source of current from the first solenoid to the second solenoid of the first valve for reversing the flow of fluid to the motor for braking the carriage motion as the carriage approaches the ending position.

3. The delimbing machine defined in claim 1 wherein said control means further includes an override circuit means connected to said logic circuit means and having a third normally open manually operable switch connected to said source means and closeable for deactivating at least a portion of said logic circuit means for permitting said motor and first and second actuator means to be controlled by selective operation of said manual switch means.

* * * * *

UNITED STATES PATENT OFFICE
CERTIFICATE OF CORRECTION

Patent No. 3,731,719            Dated 8 May 1973

Inventor(s) Victor Charles Pierrot III, Garn Farley Penfold and Thomas Wilmer Meyers It is certified that error appears in the above-identified patent and that said Letters Patent are hereby corrected as shown below:

Column 14, line 58, change "Mode for retaining" to -- mode for returning --.

Column 15, line 24, cancel "a".

Signed and sealed this 25th day of December 1973.

(SEAL)
Attest:

EDWARD M. FLETCHER, JR.        RENE D. TEGTMEYER
Attesting Officer               Acting Commissioner of Patents